(12) United States Patent
Shrestha et al.

(10) Patent No.: US 11,678,191 B2
(45) Date of Patent: Jun. 13, 2023

(54) INTEGRITY PROTECTION FOR FREQUENT SMALL DATA TRANSMISSION

(71) Applicant: Apple Inc., Cupertino, CA (US)

(72) Inventors: Bharat Shrestha, San Diego, CA (US); Jaemin Han, Portland, OR (US); Abhijeet Ashok Kolekar, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/299,532

(22) PCT Filed: Nov. 27, 2019

(86) PCT No.: PCT/US2019/063577
§ 371 (c)(1),
(2) Date: Jun. 3, 2021

(87) PCT Pub. No.: WO2020/139509
PCT Pub. Date: Jul. 2, 2020

(65) Prior Publication Data
US 2022/0046421 A1    Feb. 10, 2022

Related U.S. Application Data

(60) Provisional application No. 62/824,126, filed on Mar. 26, 2019, provisional application No. 62/785,542, filed on Dec. 27, 2018.

(51) Int. Cl.
*H04W 12/106*    (2021.01)
*H04L 9/08*    (2006.01)
(Continued)

(52) U.S. Cl.
CPC ......... *H04W 12/106* (2021.01); *H04L 9/0894* (2013.01); *H04L 9/3242* (2013.01); *H04L 47/34* (2013.01); *H04L 2209/80* (2013.01)

(58) Field of Classification Search
CPC .. H04W 12/106; H04L 9/0894; H04L 9/3242; H04L 47/34; H04L 2209/80; H04L 69/166
See application file for complete search history.

(56) References Cited

U.S. PATENT DOCUMENTS 8,976,647 B2 * 3/2015 Song ...................... H04L 47/34
370/395.2
9,136,937 B1 * 9/2015 Cheng ................... H04B 7/1855
(Continued)

OTHER PUBLICATIONS

Muhammad et al., "Low Power Data Integrity in IoT Systems", Aug. 2018, IEEE Internet of Things Journal, vol. 5, No. 4, 12 pages (Year: 2018).*
(Continued)

*Primary Examiner* — Taghi T Arani
*Assistant Examiner* — Blake I Narramore
(74) *Attorney, Agent, or Firm* — Kowert, Hood, Munyon, Rankin & Goetzel, P.C.

(57) ABSTRACT

Packet protection is described. Data of a group of packets is concatenated with a security key and a sequence number of the packet. A hash mark of the concatenated data is calculated and sent with data or control information in a packet. If each packet has reserved bits, at least some of the packets each has data, a least a portion of the hash mark, and a header having: a first bit that indicates if the hash mark is present, and a second bit that indicates if the packet is used to determine the hash mark. Otherwise, a separate control packet is sent that contains the hash mark, a first sequence number of the group of packets, and a PDU type indicating that the control packet is an integrity protection packet for the group of PDCP packets.

19 Claims, 11 Drawing Sheets

(51) Int. Cl.
*H04L 9/32* (2006.01)
*H04L 47/34* (2022.01)

(56) References Cited

U.S. PATENT DOCUMENTS

| | | | |
|---|---|---|---|
| 9,455,598 B1* | 9/2016 | Kuila | G06F 3/038 |
| 9,706,550 B1* | 7/2017 | Zhou | H04W 72/0446 |
| 2013/0339550 A1* | 12/2013 | Rangaraman | H04L 69/166 |
| | | | 709/245 |
| 2015/0222397 A1* | 8/2015 | Wang | H04L 1/1896 |
| | | | 370/329 |
| 2015/0296414 A1* | 10/2015 | Yi | H04L 69/04 |
| | | | 370/328 |
| 2016/0323166 A1* | 11/2016 | Pandey | H04L 43/0852 |
| 2018/0034839 A1* | 2/2018 | Ahuja | H04L 63/20 |
| 2018/0124865 A1* | 5/2018 | Lee | H04W 80/02 |
| 2019/0018855 A1* | 1/2019 | Harding, Jr. | G06F 16/2453 |
| 2019/0229900 A1* | 7/2019 | Khristi | H04L 9/0827 |
| 2019/0394675 A1* | 12/2019 | Baek | H04L 1/1614 |
| 2020/0037151 A1* | 1/2020 | Du | H04W 80/02 |
| 2020/0145146 A1* | 5/2020 | Decarreau | H04W 28/06 |
| 2020/0252789 A1* | 8/2020 | Zheng | H04W 8/24 |
| 2021/0385090 A1* | 12/2021 | Prasad | H04L 63/123 |

OTHER PUBLICATIONS

Muhammad Naveed Aman, et al., "Low Power Data Integrity in IoT Systems", ResearchGate [online], retrieved from <URL: https://www.researchgate.net/publication/324961709_Low_Power_Data_Integrity_in_IoT_Systems>, retrieved on Mar. 9, 2020, May 2018, 13 pgs.

Huawei, et al., "Discussion on UP Integrity Protection for Small Data in Early Data Transfer", 3GPP TSG SA WG3 (Security), Meeting #93, S3-183409, Nov. 2018, Spokane, US, 4 pgs.

International Search Report and Written Opinion for International Application No. PCT/US2019/063577 dated Mar. 19, 2020, 11 pgs.

* cited by examiner

INTEGRITY PROTECTION FOR FREQUENT SMALL DATA TRANSMISSION

This application is a U.S. National Stage filing of International Application No. PCT/US2019/063577, filed Nov. 27, 2019, which claims the benefit of priority to U.S. Provisional Application No. 62/824,126, filed Mar. 26, 2019, and U.S. Provisional Application No. 62/785,542, filed Dec. 27, 2018. Each of the aforementioned Applications is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to frequent small data transmission for cellular internet of things (CIoT) devices.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, various changes to existing systems are being contemplated to improve network processes. In particular, devices such as CIoT UEs may transmit relatively small amounts of data at frequent intervals it may be beneficial to adjust resource management to allow for such transmissions in an efficient manner.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
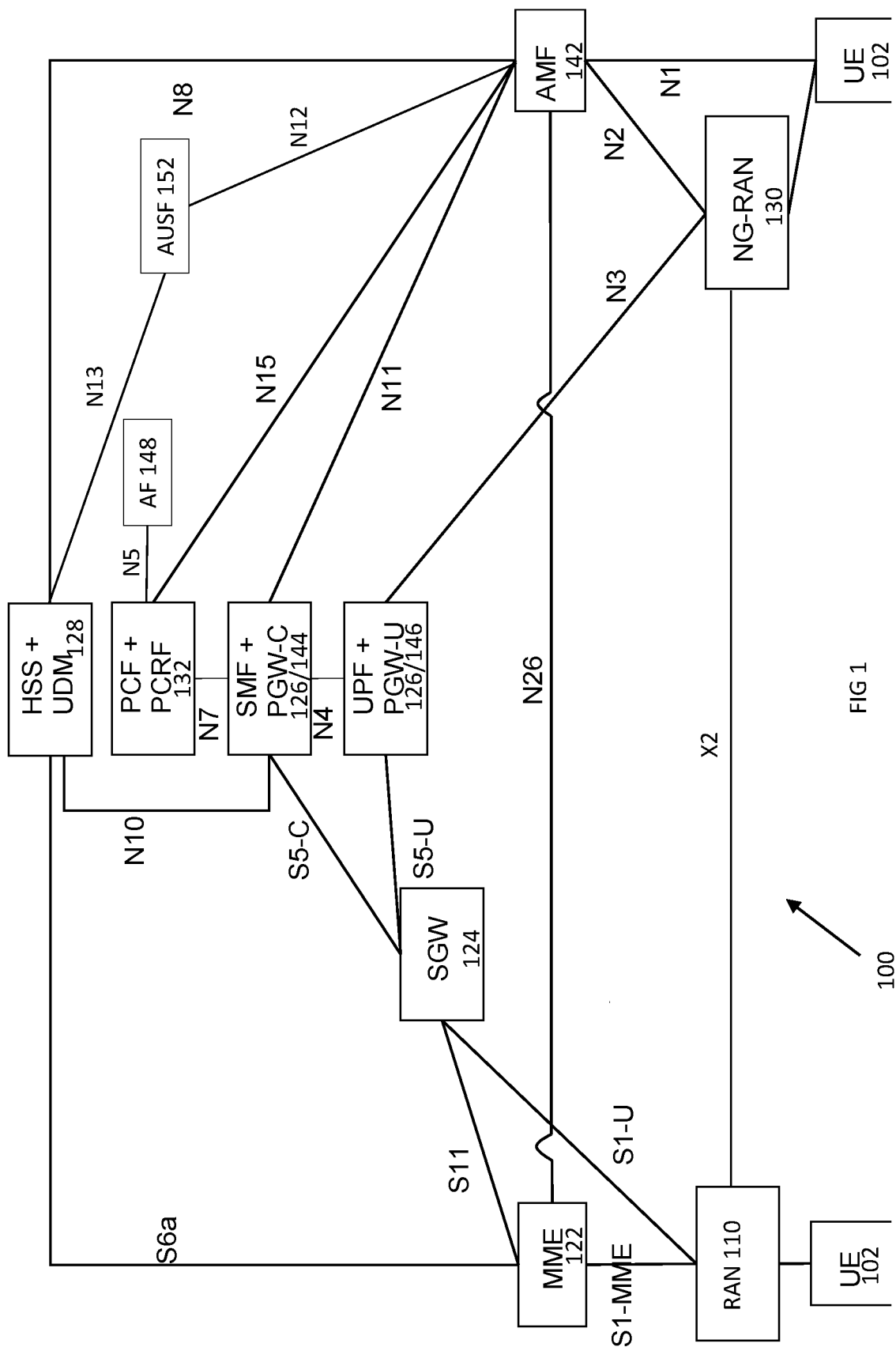
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to a radio access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
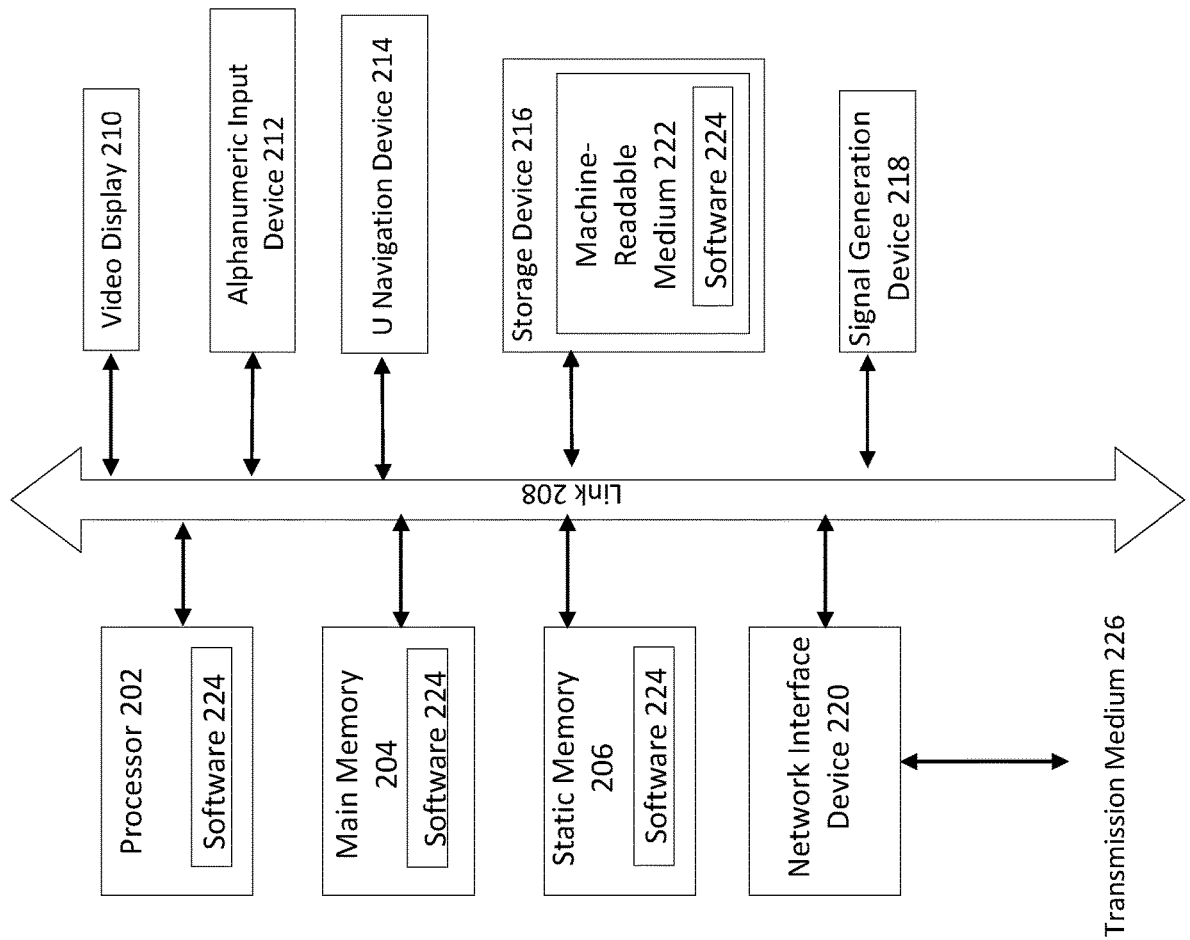
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication-based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, 5G systems are expected to provide connectivity and other types of services to a massive number of devices simultaneously. Such devices include IoT devices (CIoT UEs) that may send or receive frequent or infrequent small amounts of data. However, due to the rapid increase in the number of CIoT UEs deployed, the amount of data being transmitted on over networks will grow, even though the individual amounts of data transmitted may be relatively small. Moreover, independent of the amount of data transmitted, encryption or other security may be applied to the data.

The security overhead for frequent data transmission from massively deployed CIoT UEs, independent of the data rate used by the CIoT UEs, may further strain the network resources and lead to network attacks such as Denial of Service/Distributed Denial of Service (DOS/DDOS) attacks on the availability of network services. Thus, it is desirable to provide security solutions to support efficient frequent small data transmissions for low complexity, and low datarate CIoT UEs.

Lower than Evolved Packet System (EPS) security protection for frequent data transmission from a large number of CIoT UEs can serve as a vulnerability for exploits and network availability attacks on CIoT (e.g., bidding down attacks). In some embodiments, limiting the security overhead for frequent small data transmission may be desirable. Instead, the system security mechanisms may be used to ensure availability of the network and at least an equivalent level of security mechanisms, as in EPS, for a massive number of CIoT UEs with frequent small data transmission.

However, even if protection of small data is provided at application layer, protection in the lower layers may be added to protect the core network from malicious packets. In 5G Rel-15, the UE and the AMF support integrity protection of non-access stratum (NAS) signaling in the NAS layer. The UE and the gNB support integrity protection of radio resource control (RRC) signaling and user plane data in the Packet Data Convergence Protocol (PDCP) layer. In some embodiments, integrity protection of NAS and RRC signaling is mandatory, while integrity protection of user plane data is optional.

The support of integrity protection of user plane data in PDCP layer was introduced as a new feature in Rel-15 compared to LTE. Not all UEs, however, may support the full data rate for integrity protection for data radio bearers (DRBs) in the PDCP layer between the UE and the gNB. For example, if the UE indicates to the gNB in control signaling that 64 kbps as its maximum data rate, then the network is assumed to turn on the integrity protection for user plane data only for data rates equal or lower than 64 kbps. Note that enhanced LTE eNB's (i.e., ng-eNB) connected to a 5GC does not support integrity protection of user plane data in PDCP layer in Rel-15.

If the infrequent or frequent small data is not integrity protected between the UE and network, then an attacker may be able to modify the small data or even inject fake small data packets on behalf of the IoT device or the network on the air interface. If integrity protection of small data is not provided by the lower layers, then any modification of the small data or any replayed small data may be unable to be detected by the lower layers to avoid the delivery of the small data to the application layer for further processing. Thus, some embodiments support integrity protection and replay protection of small data where the small data would be integrity and replay protected.

Embodiments herein may provide mechanisms to reduce the integrity protection overhead if the integrity protection is applied to user plane transmissions. The embodiments herein may reduce the overhead of Message Authentication Code-Integrity (MAC-I) included in the small data when integrity protection is applied in the user plane. Some embodiments may include a lightweight algorithm that uses a hash function to provide data integrity (HASH_MARK). In this case the hash may be calculated based on the PDCP packet and may be stored at the end of PDCP data packet. The hash or HASH MARK may be calculated using a key shared between the UE and the RAN or core network to provide authenticity of the data. According to various embodiments, data may be organized into groups of PDCP packets and groups of packets may be linked with each other by storing the hash of the group in the following group. The HASH_MARK (HM) may be a hash of a group of PDCP packets and is applied to the concatenation of all data elements in the group of PDCP packets.

PDCP Packet Group Organization

According to various embodiments, an HM may be calculated for the set of N PDCP packet as a single group (where N≥1 and can be configured). In some embodiments, all PDCP packets in the group may be provided as an input to a secure HASH function along with a security key, a PDCP count, and/or other parameters. The security key may be provided at any point, e.g., prior to transmission of the first PDCP packet in the group, prior to transmission of the last PDCP packet in the group and after transmission of the first PDCP packet in the group, or after transmission of the last PDCP packet in the group. In some embodiments, the hash function may use a PDCP sequence number (or sequence number) of the last PDCP packet in the group in the calculation of HASH_MARK value. The HASH_MARK value may be calculated using the following equation.

$$HM_i = HASH(K \| PDCP\_GROUP_i \| PDCP\ SN)$$

In the above equation, $HM_i$ is the HASH_MARK value, HASH( ) is a suitable hash function, K is the security key, $PDCP\_GROUP_i$ is the PDCP group number or identifier, and PDCP_SN is the PDCP SN of the last PDCP packet in the group. The security key K can be any key shared between the UE and the Core Network, eNB/gNB, or RAN component, for example, $RRC_{int}$ (integrity protection key for RRC messages), RRCenc (encryption key for RRC messages), Upint (integrity protection key for user plane traffic), etc.

PDCP packets or data within the group may be transmitted to the receiver individually. PDCP groups can be formed based on different criteria such as QoS, Traffic patterns, etc.

The HM may not be embedded or sent with the corresponding group of PDCP packets, but may form a chain where each PDCP group has the HM for the next PDCP group that will be sent (forward chaining), or for the previous PDCP group (backward chaining). According to various embodiments, the HASH_MARK may be embedded in the earlier group of PDCP packets, for example, where the $HM_i$ may be sent with $PDCP\_GROUP_{i-1}$. Alternatively, the HM can be stored in the following group, for example, where the $HM_i$ will be sent in $PDCP\_GROUP_{i+1}$.

In some embodiments, the UE and CN may synchronize the groups using the HASH_MARK as a delimiter. A separate delimiter bit can be sent to denote the end of the group after the HASH_MARK.

The HM can be sent at the least significant bit of group of PDCP packets. In another embodiment, the hash mark can be split equally among packets within the group. For example, if there are 128 PDCP packets in each group and the hash mark is of size 128, then each PDCP packet can be concatenated with 1 digit from the hash marker. Alternatively, the hash marker can be equally divided into the different groups (Z=4) like 32 bits, and each part of HM of 32 bits size may be concatenated with after every $4^{th}$ PDCP packet in the group. A reserved bit in PDCP header can be used to denote the HASH value availability in the PDCP packet.

The receiver can extract the HM from the received PDCP data using the same function. The PDCP header bit can be used to check the availability of the HASH MARKER.

Signaling HASH MARK

Figure 3:
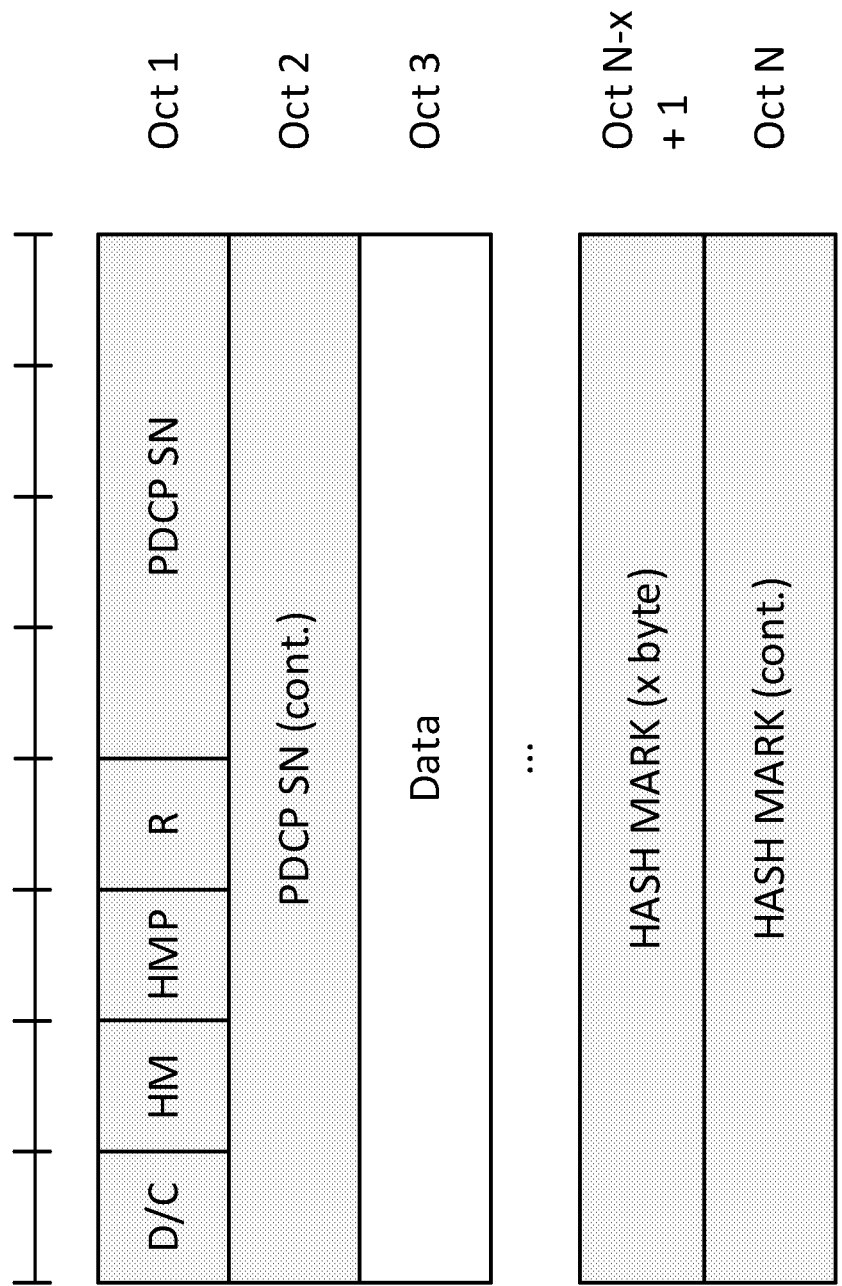
FIG. 3 illustrates a Packet Data Convergence Protocol (PDCP) control packet data unit (PDU) format for data radio bearers (DRBs) in accordance with some embodiments.
Figure 4:
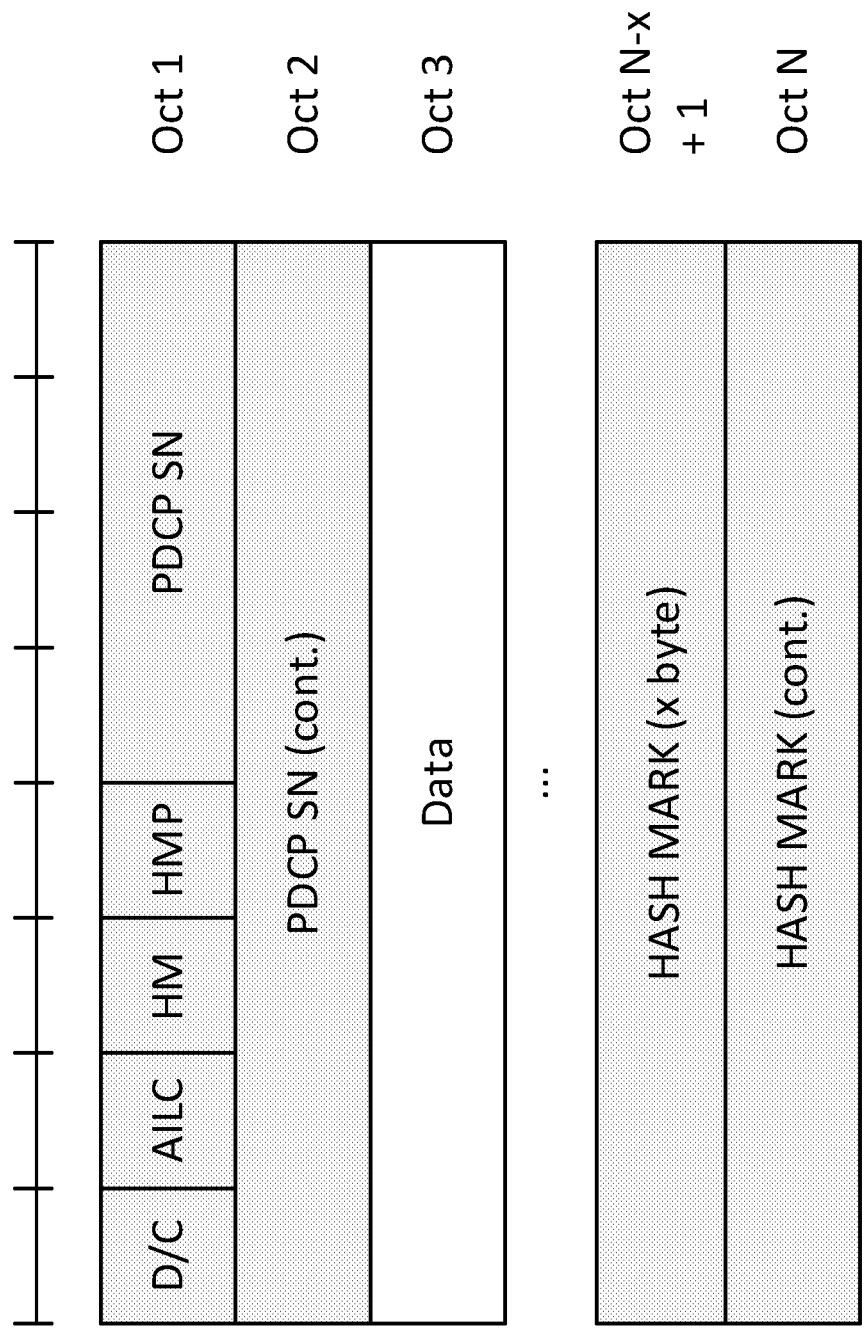
FIG. 4 illustrates another PDCP control PDU format for DRBs in accordance with some embodiments.

In some embodiments, the SN length may be 12 bits or 18 bits. Currently, PDCP data PDUs for DRBs are mapped to radio link control (RLC) Acknowledge Mode (AM) and RLC Unacknowledge Mode (UM). When the 12 bit SN length or 18 bit extended SN length is used, the existing PDCP data PDU format may have multiple reserved bits, one of which can be used to indicate the presence of HASH MARK. FIG. 3 illustrates a PDCP control PDU format for DRBs in accordance with some embodiments, while FIG. 4 illustrates another PDCP control PDU format for DRBs in accordance with some embodiments. The embodiments of FIGS. 3 and 4 show the use of 12 bit sequence numbers (SNs). The first octet may include a single bit that indicates whether the PDU is a control packet or data packet (D/C). The first octet may include a portion of the PDCP SN, which may extend through the terminal portion of the first octet and through the second octet. The third through N−x+1 octets may include the data of the PDCP control PDU, while the N−x+1 to N octets may include the x-byte HASH MARK. In FIG. 4, the first octet may also include an Assistance Information bit for Local Cache (AILC) field.

The HM field may have length of a single bit. The HM field may be an indication of whether or not integrity protection is enabled for the PDU. A value '1' may indicate that the integrity protection (HASH MARKER) is to be checked for the PDU. The receiver may thus wait for the complete PDU of a group for integrity protection check before forwarding the PDU to the upper layers.

TABLE 1

| HM field | |
| --- | --- |
| Bit | Description |
| 0 | No integrity protection |
| 1 | Integrity protection enabled |

The HPM field may have length of a single bit and may be positioned either after the HM field in the first octet, as shown in FIGS. 3 and 4, or between the D/C field and the HM field. The HPM field may be an indication of whether or not the HASH MARKER is present in the PDU. In this embodiment, a value of '1' may indicate that integrity protection (HASH MARKER) is to be checked for the received group of PDCP PDU including the present PDU. In other embodiments, a value of '1' may indicate that integrity protection (HASH MARKER) is to be checked for the next received group of PDCP PDU using the HASH MARKER.

TABLE 2

| HMP field | |
| --- | --- |
| Bit | Description |
| 0 | No HASH MARKER present |
| 1 | HASH MARKER present |

Using a Control PDCP PDU for DRBs

Figure 5:
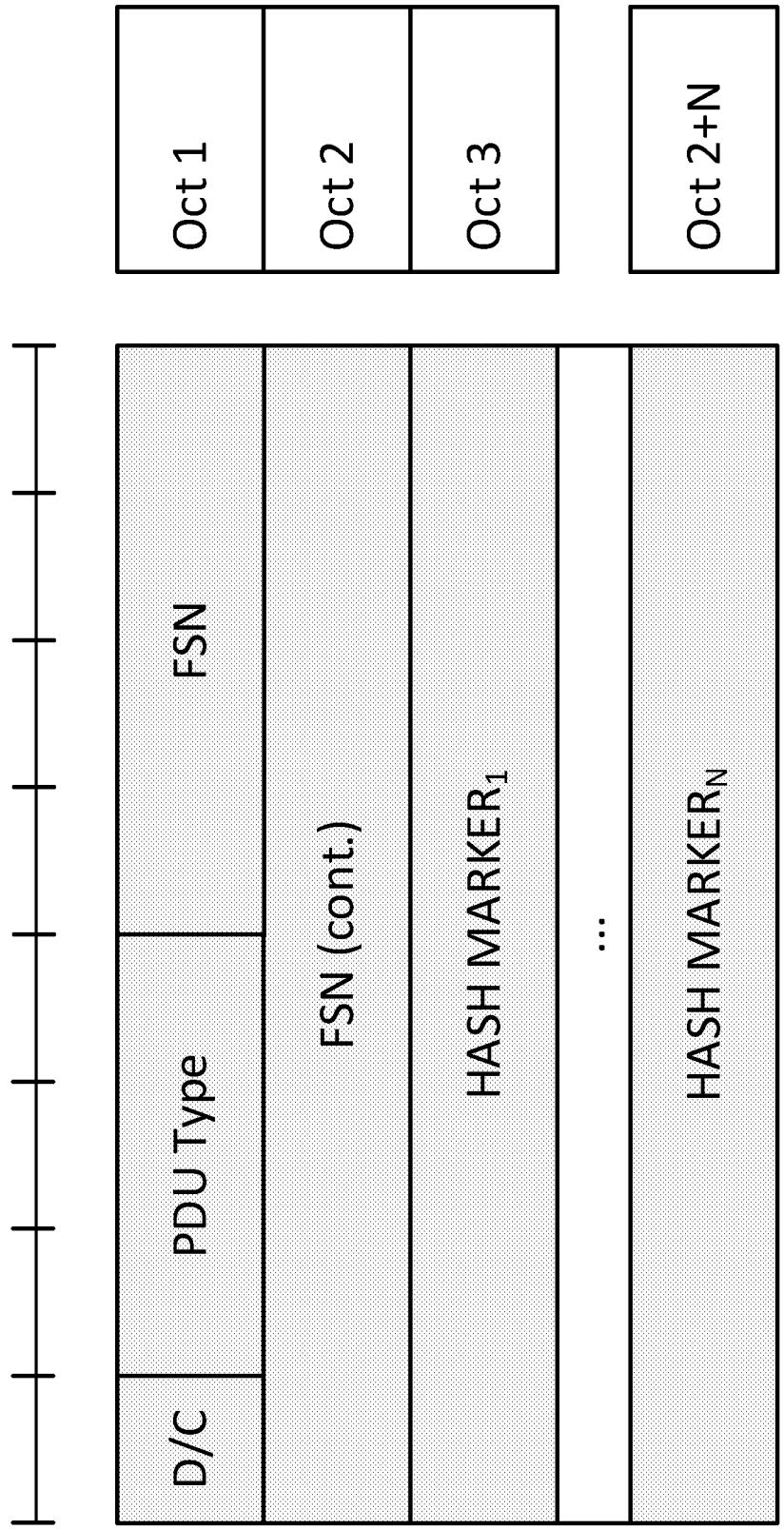
FIG. 5 illustrates a PDCP control PDU format for integrity protection of a group of PDUs in accordance with some embodiments.
Figure 6:
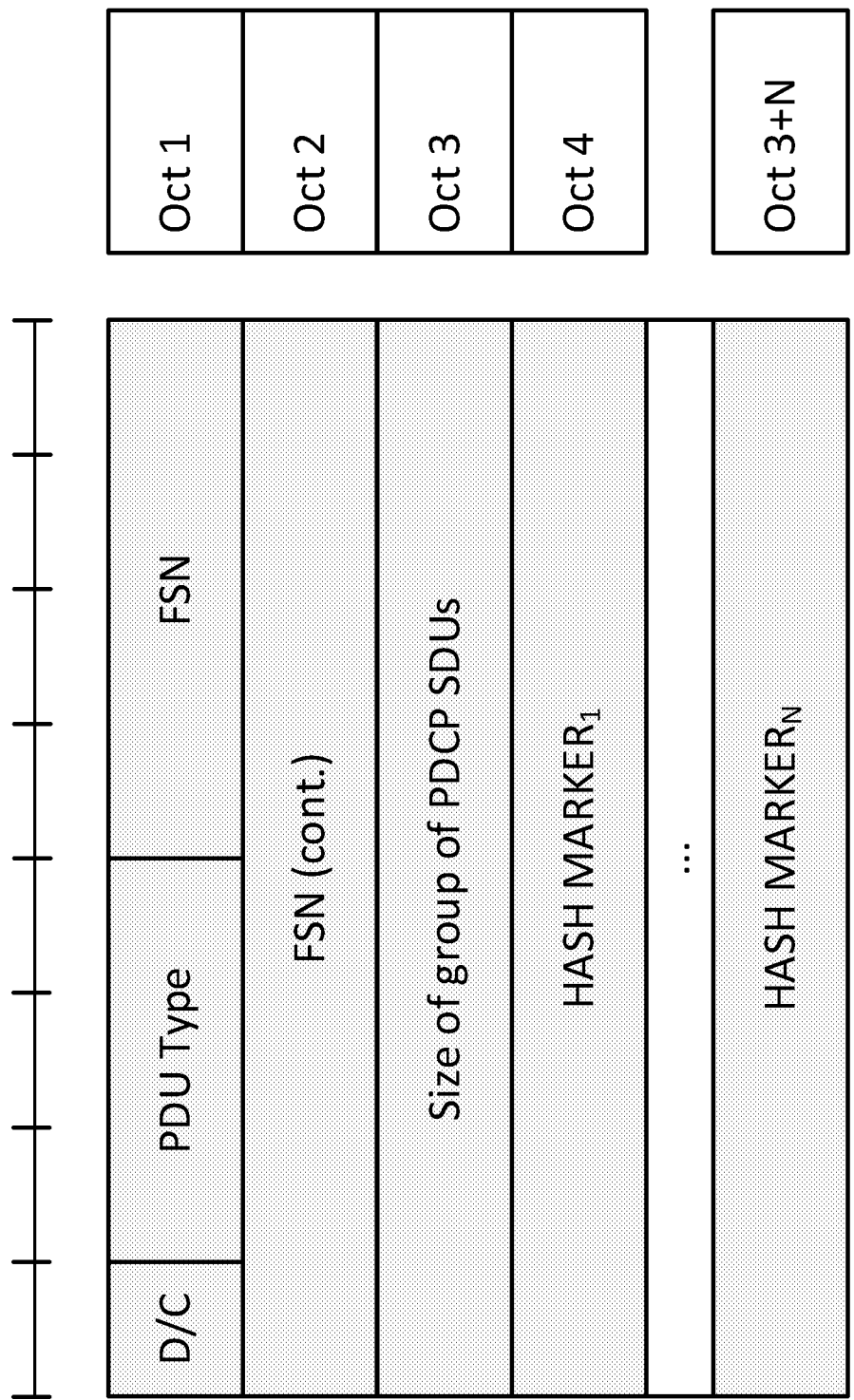
FIG. 6 illustrates another PDCP control PDU format for integrity protection of a group of PDUs in accordance with some embodiments.

When a 7 bit SN length (e.g., for NB-IoT) or a 15 bit extended SN length is used, no reserved bit (R bit) may be available to modify the existing PDCP data PDU format. Thus, in some embodiments, a new control PDCP PDU for DRBs can be defined to work with any length of SN. This new PDCP PDU for DRBs can be sent with a HASH MARKER value and a first SN of a group of PDCP PDUs for which the integrity protection is to be checked. The number of PDUs in a group for which the integrity protection is to be checked can be pre-defined (hardcoded) or configured by dedicated RRC signaling. FIGS. 5 and 6 each illustrates a PDCP control PDU format for integrity protection of a group of PDUs in accordance with some embodiments.

As shown in FIGS. 5 and 6, the first octet may contain the D/C field, a three bit PDU type field that indicates the type of the PDU, and a first sequence number (FSN). The second octet contains the remainder of the FSN. In FIG. 5, octets 3 to 2+N may contain the N-byte HASH MARKER, while in FIG. 6, octets 4 to 3+N may contain the N-byte HASH MARKER with the size of the group of PDU Service Data Units (SDUs) in octet 3.

The new three bit PDU type may be defined as follows:

TABLE 3

PDU type

| Bit | Description |
|---|---|
| 000 | PDCP status report |
| 001 | Interspersed ROHC feedback packet |
| 010 | LWA status report |
| 011 | LWA end-marker packet |
| 100 | UDC feedback packet |
| 101 | integrity protection packet of a group of PDUs |
| 110-111 | reserved |

The new FSN type may have different lengths, depending on the SN length. For example, the FSN length may be 12 bits when a 12 bit SN length is used, 15 bits when a 15 bit SN length is used, and 18 bits when an 18 bit SN length is used. The FSN field may include the PDCP SN of the first PDCP SDU of a group of SDUs for which the integrity protection is to be checked. Whether or not the control PDU for integrity protection is to be used can be configured via dedicated RRC signaling per 3GPP TS 36.331.

PDCP-Config

The IE PDCP-Config may be used to set the configurable PDCP parameters for data radio bearers. The PDCP-Config information element may be provided as:

```
-- ASN1START
PDCP-Config ::=                                         SEQUENCE {
        discardTimer                                            ENUMERATED {
ms50, ms100, ms150, ms300, ms500,
ms750, ms1500, infinity
        }
                                                                OPTIONAL,          -- Cond
Setup
        rlc-AM                                                  SEQUENCE {
                statusReportRequired                            BOOLEAN
        }
                                                                OPTIONAL,          -- Cond
Rlc-AM
        rlc-UM                                                  SEQUENCE {
                pdcp-SN-Size                                    ENUMERATED
{len7bits, len12bits}
        }
                                                                OPTIONAL,          -- Cond
Rlc-UM
        headerCompression                                       CHOICE {
                notUsed                                                 NULL,
                rohc
        SEQUENCE {
                maxCID
        INTEGER (1..16383)                              DEFAULT 15,
                        profiles
                SEQUENCE {
                                profile0x0001
        BOOLEAN,
                                profile0x0002
        BOOLEAN,
                                profile0x0003
        BOOLEAN,
                                profile0x0004
        BOOLEAN,
                                profile0x0006
        BOOLEAN,
                                profile0x0101
        BOOLEAN,
                                profile0x0102
        BOOLEAN,
                                profile0x0103
        BOOLEAN,
                                profile0x0104
        BOOLEAN
                        },
                        ...
                }
        },
        ...,
        [[      rn-IntegrityProtection-r10              ENUMERATED {enabled} OPTIONAL
        -- Cond RN
        ]],
        [[      pdcp-SN-Size-v1130                      ENUMERATED
{len15bits}             OPTIONAL        -- Cond Rlc-AM2
        ]],
        [[      ul-DataSplitDRB-ViaSCG-r12              BOOLEAN
```

```
                    OPTIONAL,        -- Need ON
            t-Reordering-r12                        ENUMERATED {
                                                                    ms0,
    ms20, ms40, ms60, ms80, ms100, ms120, ms140,
                                                                    ms160,
    ms180, ms200, ms220, ms240, ms260, ms280, ms300,
                                                                    ms500,
    ms750, spare14, spare13, spare12, spare11, spare10,
                                                                    spare9,
    spare8, spare7, spare6, spare5, spare4, spare3,
                                                                    spare2,
    spare1 }                            OPTIONAL        -- Cond SetupS
        ]],
        [[      ul-DataSplitThreshold-r13       CHOICE {
                    release                                 NULL,
                    setup                                   ENUMERATED
    {
                                                                    b0,
    b100, b200, b400, b800, b1600, b3200, b6400, b12800,
                                                                    b25600,
    b51200, b102400, b204800, b409600, b819200,
                                                                    spare1}
                }
                                                OPTIONAL,       -- Need
    ON
                pdcp-SN-Size-v1310              ENUMERATED
    {len18bits }    OPTIONAL,           -- Cond Rlc-AM3
                statusFeedback-r13              CHOICE {
                    release                                 NULL,
                    setup                                   SEQUENCE {
                        statusPDU-TypeForPolling-r13        ENUMERATED
    {type1, type2}      OPTIONAL,       --Need ON
                        statusPDU-Periodicity-Type1-r13     ENUMERATED
    {
                                                                    ms5,
    ms10, ms20, ms30, ms40, ms50, ms60, ms70, ms80, ms90,
                                                                    ms100,
    ms150, ms200, ms300, ms500, ms1000, ms2000, ms5000,
            ms10000, ms20000, ms50000}          OPTIONAL,   --Need ON
                        statusPDU-Periodicity-Type2-r13     ENUMERATED
    {
                                                                    ms5,
    ms10, ms20, ms30, ms40, ms50, ms60, ms70, ms80, ms90,
                                                                    ms100,
    ms150, ms200, ms300, ms500, ms1000, ms2000, ms5000,
            ms10000, ms20000, ms50000}          OPTIONAL,   --Need ON
                        statusPDU-Periodicity-Offset-r13    ENUMERATED {
                                                                    ms1,
    ms2, ms5, ms10, ms25, ms50, ms100, ms250, ms500,
            ms2500, ms5000, ms25000} OPTIONAL           --Need ON
                    }
                }                               OPTIONAL        -- Need
    ON
        ]],
        [[      ul-LWA-Config-r14               CHOICE {
                    release                                 NULL,
                    setup                                   SEQUENCE {
                        ul-LWA-DRB-ViaWLAN-r14              BOOLEAN,
                        ul-LWA-DataSplitThreshold-r14       ENUMERATED {
                                                                    b0,
    b100, b200, b400, b800, b1600, b3200, b6400,
                                                                    b12800,
    b25600, b51200, b102400, b204800, b409600,
            b819200 }                           OPTIONAL    --Need OR
                }
            }                                   OPTIONAL,       -- Need ON
                uplinkOnlyHeaderCompression-r14 CHOICE {
                    notUsed-r14                             NULL,
                    rohc-r14                                SEQUENCE {
                        maxCID-r14
                INTEGER (1..16383)              DEFAULT 15,
                        profiles-r14
```

-continued

```
                SEQUENCE {
                                                profile0x0006-r14
                    BOOLEAN
                                        },
                                        ...
                                }
                        }
                                                OPTIONAL -- Need ON
    ]],
    [[      uplinkDataCompression-r15 SEQUENCE {
                        bufferSize-r15                  ENUMERATED {kbyte2,
kbyte4, kbyte8, spare1},
                        dictionary-r15                  ENUMERATED {sip-SDP,
operator}OPTIONAL, -- Need OR
                                        ...
                }
                                                OPTIONAL,-- Cond R1c-AM2
                pdcp-DuplicationConfig-r15 CHOICE {
                        release                         NULL,
                        setup                           SEQUENCE {
                                pdcp-Duplication-r15    ENUMERATED
{configured, activated}
                        }
                }
                                                OPTIONAL -- Need ON
    ]],
    [[IP-Required-DRB-r15xy                     BOOLEAN,
    OPTIONAL -- Need ON
     IP-GroupSize-r15xy                         ENUMERATED {1, 2, 4, spare1}
                OPTIONAL -- Need ON
    ]]
}
-- ASN1STOP
```

| PDCP-Config field descriptions |
|---|
| bufferSize |

Indicates the buffer size applied for UDC specified in TS 36.323 [8]. Value
kbyte2 means 2048 bytes, kbyte4 means 4096 bytes and so on. E-UTRAN does not reconfigure bufferSize for a DRB except for handover cases.

| dictionary |
|---|

Indicates which pre-defined dictionary is used for UDC as specified in TS 36.323 [8]. The value sip-SDP means that UE shall prefill the buffer with standard dictionary for SIP and SDP defined in TS 36.323 [8], and the value
operator means that UE shall prefill the buffer with operator-defined dictionary.

| discardTimer |
|---|

Indicates the discard timer value specified in TS 36.323 [8]. Value in milliseconds. Value ms50 means 50 ms, ms100 means 100 ms and so on.

| headerCompression |
|---|

E-UTRAN does not reconfigure header compression for an MCG DRB except for upon handover and upon the first reconfiguration after RRC connection re-establishment. E-UTRAN does not reconfigure header compression for a SCG DRB except for upon SCG change involving PDCP
re-establishment. For split and LWA DRBs E-UTRAN configures only notUsed.
E-UTRAN only configures this field when neither uplinkOnlyHeaderCompression nor uplinkDataCompression is configured. If headerCompression is configured, the UE shall apply the configured ROHC profile(s) in both uplink and downlink.

| maxCID |
|---|

Indicates the value of the MAX_CID parameter as specified in TS 36.323 [8]. The total value of MAX_CIDs across all bearers for the UE should be less than or equal to the value of maxNumberROHC-ContextSessions parameter as indicated by the UE. E-UTRAN configures the same value for
maxCID in both headerCompression and uplinkOnlyHeaderCompression.

-continued

| PDCP-Config field descriptions |
|---|
| pdcp-Duplication |

Parameter for configuring PDCP duplication as specified in TS 36.323 [8]. Value configured indicates that PDCP duplication is configured but initially
deactivated and value activated indicates that PDCP duplication is configured and activated upon configuration. For EN-DC, E-UTRAN configures PDCP duplication for MCG DRB only if PDCP duplication is not configured for any split DRB.

| pdcp-SN-Size |
|---|

Indicates the PDCP Sequence Number length in bits. For RLC UM: value len7bits means that the 7-bit PDCP SN format is used and len12bits means
that the 12-bit PDCP SN format is used. For RLC AM: value len15bits means that the 15-bit PDCP SN format is used, value len18bits means that the 18-bit PDCP SN format is used, otherwise if the field is not included upon setup of the PCDP entity 12-bit PDCP SN format is used, as specified
in TS 36.323 [8].

| profiles |
|---|

The profiles used by both compressor and decompressor in both UE and E-
UTRAN. The field indicates which of the ROHC profiles specified in TS 36.323 [8] are supported, i.e. value true indicates that the profile is supported. Profile 0x0000 shall always be supported when the use of ROHC
is configured. If support of two ROHC profile identifiers with the same 8 LSB's is signalled, only the profile corresponding to the highest value shall
be applied. E-UTRAN does not configure ROHC while t-Reordering is configured (i.e. for split DRBs, for LWA bearers or upon reconfiguration from split or LWA to MCG DRB).

| statusFeedback |
|---|

Indicates whether the UE shall send PDCP Status Report periodically or by
E-UTRAN polling as specified in TS 36.323 [8]. E-UTRAN configures this
field only for LWA DRB.

| PDCP-Config field descriptions |
| --- |
| statusPDU-TypeForPolling |
| Indicates the PDCP Control PDU option when it is triggered by E-UTRAN polling. Value type1 indicates using the legacy PDCP Control PDU for PDCP status reporting and value type2 indicates using the LWA specific PDCP Control PDU for LWA status reporting as specified in TS 36.323 [8]. |
| statusPDU-Periodicity-Type1 |
| Indicates the value of the PDCP Status reporting periodicity for type1 Status PDU, as specified in TS 36.323 [8]. Value in milliseconds. Value ms5 means 5 ms, ms10 means 10 ms and so on. |
| statusPDU-Periodicity-Type2 |
| Indicates the value of the PDCP Status reporting periodicity for type2 Status PDU, as specified in TS 36.323 [8]. Value in milliseconds. Value ms5 means 5 ms, ms10 means 10 ms and so on. |
| statusPDU-Periodicity-Offset |
| Indicates the value of the offset for type2 Status PDU periodicity, as specified in TS 36.323 [8]. Value in milliseconds. Value ms1 means 1 ms, ms2 means 2 ms and so on. |
| t-Reordering |
| Indicates the value of the reordering timer, as specified in TS 36.323 [8]. Value in milliseconds. Value ms0 means 0 ms and behaviour as specified in 7.3.2 applies, ms20 means 20 ms and so on. |
| rn-IntegrityProtection |
| Indicates that integrity protection or verification shall be applied for all subsequent packets received and sent by the RN on the DRB. |
| statusReportRequired |
| Indicates whether or not the UE shall send a PDCP Status Report upon re-establishment of the PDCP entity and upon PDCP data recovery as specified in TS 36.323 [8]. |
| ul-DataSplitDRB-ViaSCG |
| Indicates whether the UE shall send PDCP PDUs via SCG as specified in TS 36.323 [8]. E-UTRAN only configures the field (i.e. indicates value TRUE) for split DRBs. |
| ul-DataSplitThreshold |
| Indicates the threshold value for uplink data split operation specified in TS 36.323 [8]. Value b100 means 100 Bytes, b200 means 200 Bytes and so on. E-UTRAN only configures this field for split DRBs. |
| ul-LWA-DRB-ViaWLAN |
| Indicates whether the UE shall send PDCP PDUs via the LWAAP entity as specified in TS 36.323 [8]. E-UTRAN only configures this field (i.e. indicates value TRUE) for LWA DRBs. |
| ul-LWA-DataSplitThreshold |
| Indicates the threshold value for uplink data split operation as specified in TS 36.323 [8]. Value b0 means 0 Bytes, b100 means 100 Bytes and so on. E-UTRAN only configures this field for LWA DRBs. |
| uplinkDataCompression |
| Indicates the UDC configuration that the UE shall apply. E-UTRAN does not configure uplinkDataCompression for a DRB, if headerCompression or uplinkOnlyHeaderCompression is already configured for the DRB. E-UTRAN does not configure uplinkDataCompression for the split and LWA DRBs. The maximum number of DRBs where uplinkDataCompression can be applied is two. In this version of the specification, for existing DRBs, E-UTRAN can only configure uplinkDataCompression via handover procedure. |
| uplinkOnlyHeaderCompression |
| Indicates the ROHC configuration that the UE shall apply uplink-only ROHC operations, see TS 36.323 [8]. E-UTRAN only configures this field when headerCompression is not configured. E-UTRAN does not reconfigure header compression for an MCG DRB except for upon handover and upon the first reconfiguration after RRC connection re-establishment. E-UTRAN does not reconfigure header compression for a SCG DRB except for upon SCG change involving PDCP re-establishment. For split and LWA DRBs E-UTRAN configures only notUsed. |
| IP-Required-DRB |
| Indicates whether to send the integrity protection control PDU for PDCP PDUs in the DRBs. |
| IP-Groupsize |
| Indicates some PDCP SDUs for which the integrity protection is checked. |

Integrity Protection for Early Data Transmission (EDT)

EDT involves transmitting a single packet, such as a single PDCP PDU. For example, in some EDT embodiment one uplink data transmission may be optionally followed by one downlink data transmission during the random access procedure. EDT may be triggered when the upper layers have requested the establishment or resumption of the RRC Connection for Mobile Originated (MO) data and the uplink data size is less than or equal to a transport block size indicated in the system information.

In EDT, the UE may send a preamble (Msg1) over a Physical Random Access Channel (PRACH) transmission to the base station (eNB/gNB) to start a random access channel (RACH) procedure. The preamble may indicate the intent of the UE to use EDT. The RACH request may be transmitted by the UE to the base station using a RACH resource. For example, the RACH request may be transmitted over 6 Resource blocks. The RACH request may contain a preamble index, which may be randomly selected based on the size of the RRC connection request from preamble information in system information block (SIB). However, the RACH Request for EDT may use a unique preamble that is different from that used for a legacy procedure.

The base station, having received the RACH request may allocate a temporary Cell Radio Network Temporary Identifier (C-RNTI) for the UE. The temporary Cell RNTI may be transmitted to the UE in a RACH Response message (RAR) (Msg2) from the RAN. The RAR message may also contain the appropriate timing advance (TA) for the UE, determined by the base station. The RAR message may contain a scheduling grant for the UE to send a RRCConnectionResumeRequest message, where the scheduling grant may indicate whether frequency hopping is to be used as well as the resource block assignment. The RAR message may further indicate the modulation and coding scheme and the power for the PUSCH to be used by the UE. If EDT is to be used, the UL grant in the RAR message may be larger than that of a legacy RAR grant to provide additional UL resources for transmission by the UE of a UL message in addition to a RRCConnectionResumeRequest message.

When the UE receives the UL grant in RAR for EDT, as in the legacy procedure, the UE may transmit a RRCConnectionResumeRequest message including a shortResumeMAC-I. The UE may also multiplex the UL UP data with the RRC message to transmit in Msg3. Msg3 may use a SAE-Temporary Mobile Subscriber Identity (S-TMSI).

The base station may in response transmit an RRC Connection Setup message (Msg4) to the UE. Note that the UE may not transition from the RRC_Idle state to the RRC_Connected state during EDT.

In EDT-based embodiments, integrity protection is to be checked for a single PDCP PDU. A new MAC-I or hash marker can be calculated for the PDCP PDU for EDT and added either to the existing PDCP data PDU for DRBs or a new PDCP control PDU for DRB can be defined similarly as described in relation to FIGS. 3-6.

EDT may be applied to narrowband IoT (NB-IoT) transmissions. However, as NB-IoT uses only a 7 bit SN, the existing PDU format may be unable to be used. Thus, a new PDCP control PDU to send the authentication code for the integrity protection of PDCP PDU can be defined for any UE supporting EDT. The new PDCP control PDU may, in some embodiments, be limited to being sent only when the UE is performing EDT. The PDCP data PDU and the PDCP control PDU may be multiplexed by lower layers and sent as a single MAC PDU using EDT grant. The overhead of integrity protection control PDU can also be taken into account on deciding whether to use EDT (in Msg3 or Msg4) or not for the given size of user data.

In case of fallback to a legacy procedure from EDT, the UE may update the Msg3 buffer. In this case, the PDCP control PDU for integrity protection may be discarded and not sent, as in the legacy procedure. If the PDCP control packet for integrity protection is not present, the integrity protection may not be applied. In one example, the value of the hash marker can be a new 16 bit (or 32 bit) shortResumeMAC-I (or MAC-I) calculated with additional input parameter called HASH code of the PDCP PDU.

Figure 7:
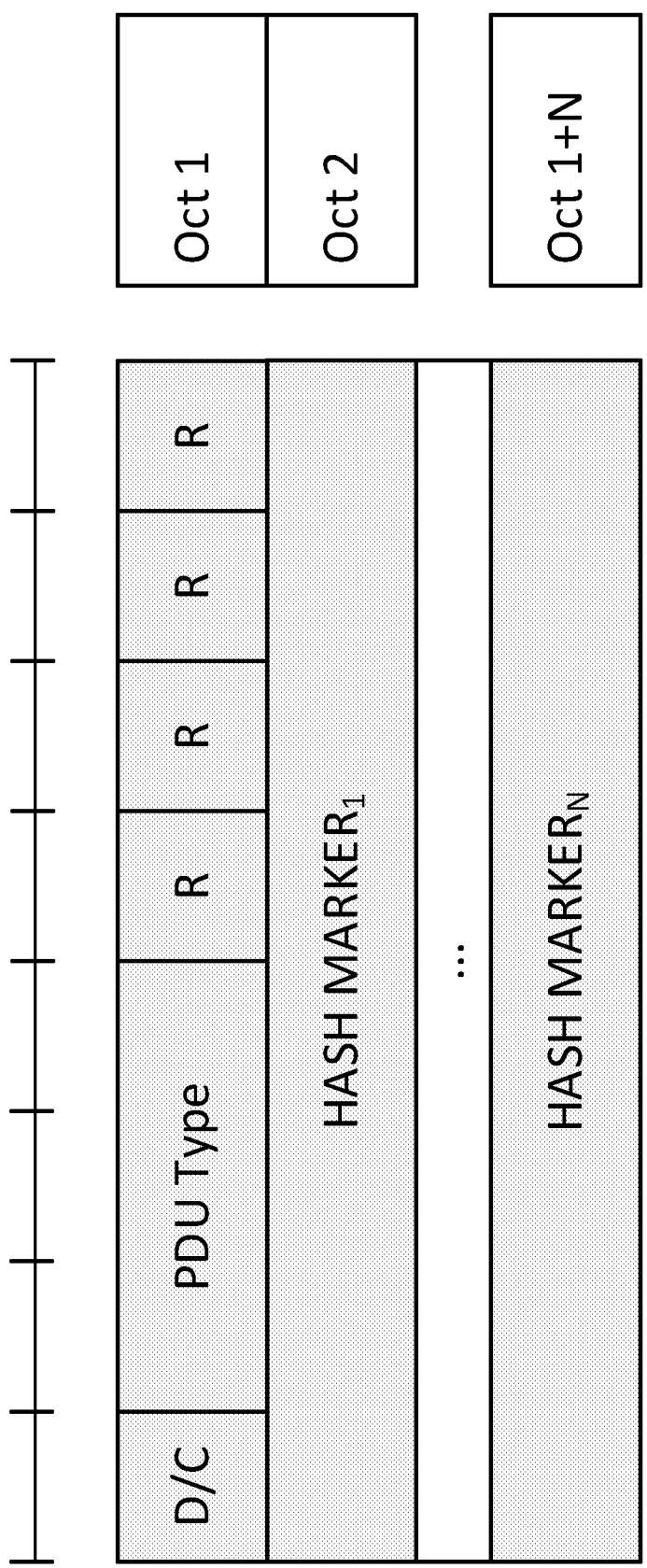
FIG. 7 illustrates a PDCP control PDU format for integrity protection during early data transmission (EDT) in accordance with some embodiments.

FIG. 7 illustrates a PDCP control PDU format for integrity protection during EDT in accordance with some embodiments. The new PDU type may have a three bit length and may be:

TABLE 3

EDT PDU type

| Bit | Description |
| --- | --- |
| 000 | PDCP status report |
| 001 | Interspersed ROHC feedback packet |
| 010 | LWA status report |
| 011 | LWA end-marker packet |
| 100 | UDC feedback packet |
| 101 | integrity protection packet of EDT data |
| 110-111 | reserved |

As not many bits available for the PDU type, one reserved code point of the PDU type can be used to indicate another extended PDU type with a length of 4 bits. The extended PDU type can be used to indicate the integrity protection for only EDT data in some embodiments. In other embodiments, the extended PDU type can be used to indicate the integrity protection for EDT data and other types of data.

Using Existing shortResumeMAC-I

For EDT, the existing shortResumeMAC-I algorithm can be used with an additional input parameter extracted from the UL data. As the length of the newly calculated shortResumeMAC-I may be same as that of the legacy shortResumeMAC-I, the newly calculated shortResumeMAC-I can be sent by replacing the legacy shortResumeMAC-I in the RRC message. However, the value of the new shortResumeMAC-I may be different from that of the legacy shortResumeMAC-I and in case of fallback to the legacy procedure, the UE may send only the RRC message without UL data. In this case, the base station may receive the newly calculated shortResumeMAC-I but will be unaware of the input parameter that was extracted from the UL data, as UL data is not sent in legacy procedure.

In such a fallback mechanism, a new MAC CE can be defined to transfer the input parameter that was extracted from the UL data and sent together with the RRC message.

In another option, a new 32-bit short resume MAC-I can be defined. The 16 bit LSB (or MSB) of the new shortResumeMAC-I may correspond to the value of legacy shortResumeMAC-I, whereas the 16 bit MSB (or LSB) may corresponds to the value of shortResumeMAC-I calculated with additional input parameter extracted from the UL data. In the case of a fallback, there will be no UL data present, in which case eNB will use only the 16 bit LSB of the new shortResumeMAC-I.

In another option, in addition to the legacy shortResumeMAC-I, another shortResumeMAC-I calculated with additional input parameter extracted from the UL data may also be included in the RRC message or PDCP control PDU or MAC CE for integrity protection of UL data. In case of a fallback, the other shortResumeMAC-I may either be transmitted or ignored by the base station. In this case, a spare bit in the RRC connection resume request message can be used and extended, or a new message class extension can be used, to include the new shortResumeMAC-I for UL data.

In another option, if the UE prepares multiple RRC messages for EDT, then one of the messages may be the legacy RRC message including the short resume ID (24 bits) and shortResumeMAC-I with legacy input parameters and sent in Msg3 in case of fallback from EDT to the legacy procedure.

Further details are provided below regarding the manner in which a new MAC-I or CRC is calculated using a derived key and HASH code of UL data for integrity protection of UL data and sent via the MAC layer. In addition, the manner in which network verifies the integrity protection of the UL data is provided.

PDCP Control PDU for DRB for Integrity Protection of UP Data

Figure 8:
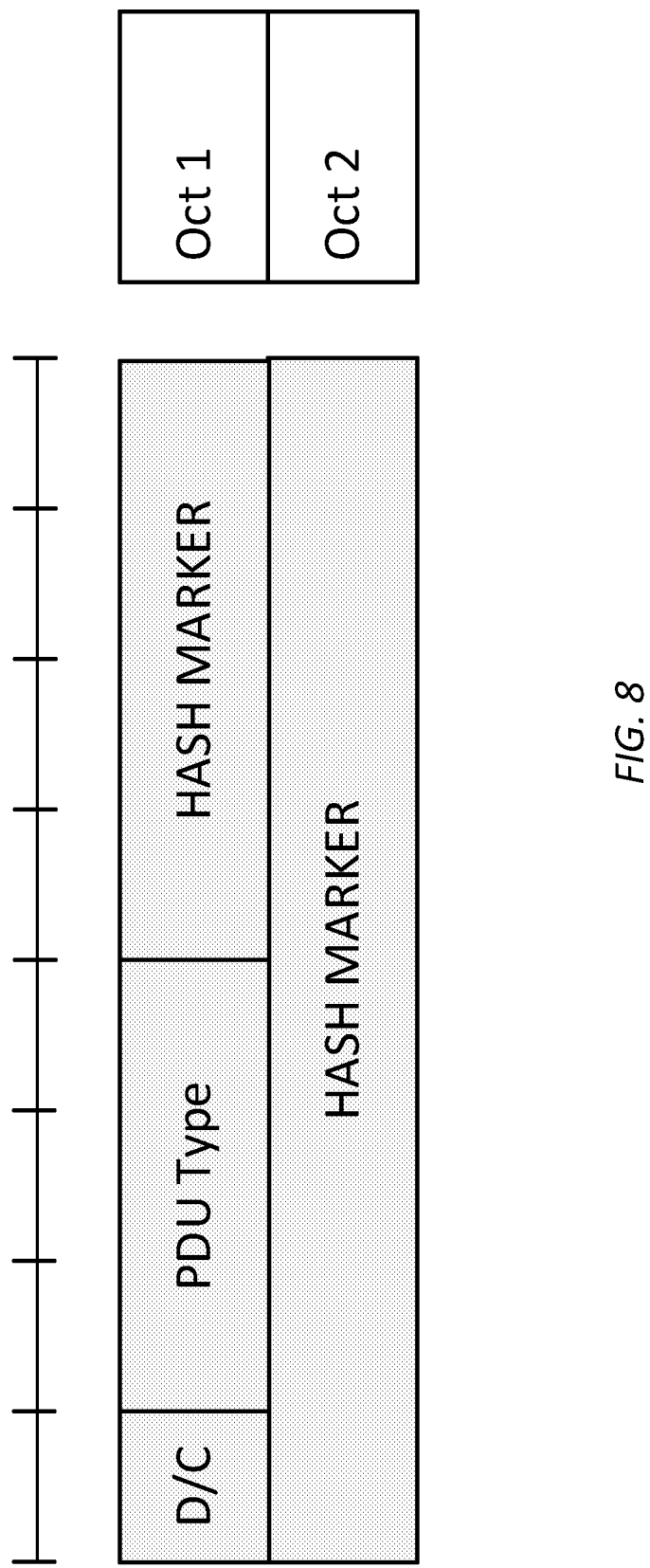
FIG. 8 illustrates a PDCP control PDU format for integrity protection of a PDU in accordance with some embodiments.

In some embodiments, the length of the HASH MARKER can be 8 bit or 12 bits. FIG. 8 illustrates a PDCP control PDU format for integrity protection of a PDU in accordance with some embodiments. If the length is 12 bits, as shown in FIG. 8, then four reserved fields can be used for the HASH MARKER. The HASH MARKER may be simply a CRC check of a single PDCP SDUs or PDUs, or of multiple PDCP SDUs or PDUs. The CRC check can be calculated using an old or newly derived AS key (e.g., KRRCint).

RRC/MAC Modeling

In some embodiments, the RRC or PDCP layer can also calculate a HASH key or new MAC-I (which can be a new shortResumeMAC-I or new CRC) derived using an AS key (e.g., KRRint) and HASH code from the PDCP SDU(s) or PDCP PDU(s). The HASH key can be X bit (e.g., ≥8 bits) long and delivered by the lower layers (e.g., MAC). In more detail, four operations may occur: the RRC layer may calculate the shortResumeMAC-I as in legacy operations to include the shortResumeMAC-I in the RRCConnectionResumeRequest message. When resuming the integrity protection and ciphering algorithm in the lower layer, the RRC layer may indicate to calculate the HASH. The RRC layer may receive a HASH code(s) of one or more PDCP PDU(s) from the lower layers. The RRC layer may calculate the new MAC-I and request lowers layer to transmit the new MAC-I. As in legacy operation, the RRC layer may submit the RRCConnectionResumeRequest message to the lower layers for transmission.

The UE may configure the lower layers to use EDT. The lower layers may be configured to provide the HASH of the uplink data PDCP PDUs and store them in VarShortResumeMAC-EDT-Input. The new shortResumeMAC-EDT-I may be set to the 16 least significant bits of the MAC-I calculated: over the ASN.1 encoded as per section 8 (i.e., a multiple of 8 bits) VarShortResumeMAC-EDT-Input (or VarShortResumeMAC-EDT-Input-NB in NB-IoT), with the KRRCint key and the previously configured integrity protection algorithm; and with all input bits for COUNT, BEARER and DIRECTION set to binary ones. The shortResumeMAC-EDT-I may be submitted to the lower layers for transmission.

That is, at the MAC layer, when the UE receives a UL grant for EDT, the UE may check if the upper layers (i.e., RRC layer) has provided the new MAC-I (VarShortResumeMAC-EDT-I) for transmission. If so, the MAC layer may append the new MAC-I before the CCCH SDUs. The "R" field in the MAC subheader can be used to indicate that a fixed size MAC CE is appended either in the front or at the end of the CCCH SDU. Alternatively, it may be specified that the UL EDT CCCH SDU always begins with a fixed length (x bit) MAC control element for MAC-I.

If the Random Access Preamble associated with EDT was transmitted and UL grant provided in the Random Access Response message is not for EDT: an indication may be provided to the upper layers that EDT is cancelled due to the UL grant not being for EDT; the Msg3 buffer may be flushed for CP-EDT; for UP-EDT, the MAC PDU may be updated in the Msg3 buffer in accordance with the uplink grant received in the Random Access Response and the shortResumeMAC-EDT-I MAC CE, if present, may be discarded. If the Random Access Preamble associated with EDT was transmitted, the UL grant was received in a Random Access Response for EDT, and there is a MAC PDU in the Msg3 buffer: if the TB size according to edt-SmallTBS-Enabled and as described in subclause 8.6.2 and 16.3.3 of TS 36.213 does not match the size of the MAC PDU in the Msg3 buffer: the MAC entity may update the MAC PDU in the Msg3 buffer in accordance with the TB size. If the response is the first successfully received Random Access Response within this Random Access procedure; or if CP-EDT is cancelled due to the UL grant provided in the Random Access Response message not being for EDT: if the transmission is not being made for the CCCH logical channel, an indication may be provided to the Multiplexing and assembly entity to include a C-RNTI MAC control element in the subsequent uplink transmission; for UP-EDT, if the upper layer has provided VarShortResumeMAC-EDT-I, an indication may be provided to the Multiplexing and assembly entity to include a shortResumeMAC-EDT-I MAC control element in the subsequent uplink transmission; and the MAC PDU may be obtained to transmit from the "Multiplexing and assembly" entity and store it in the Msg3 buffer.

The UE can add a new MAC CE for the MAC-I. To let the eNB know that shortResumeMAC-EDT-I MAC control element is included in the MAC PDU, a new LCID can be used or a reserved bit in the MAC subheader can be used. In some embodiments, the length of the LCID can be extended from 5 bits to 6 bits with additional of "R" bits to the LCID bits.

TABLE 4

Values of LCID for UL-SCH

| "R" bit in MAC subheader | Codepoint/Index | LCID values |
| --- | --- | --- |
| 0 | 00000 | CCCH |
| 0 | 00001-01010 | Identity of the logical channel |
| 0 | 01011 | CCCH |
| 0 | 01100 | CCCH |

TABLE 4-continued

Values of LCID for UL-SCH

| "R" bit in MAC subheader | Codepoint/Index | LCID values |
| --- | --- | --- |
| 0 | 01101 | CCCH and Extended Power Headroom Report |
| 0 | 01110-01111 | Reserved |
| 0 | 10000 | Extended logical channel ID field |
| 0 | 10001 | Reserved |
| 0 | 10010 | AUL confirmation (4 octets) |
| 0 | 10011 | AUL confirmation (1 octet) |
| 0 | 10100 | Recommended bit rate query |
| 0 | 10101 | SPS confirmation |
| 0 | 10110 | Truncated Sidelink BSR |
| 0 | 10111 | Sidelink BSR |
| 0 | 11000 | Dual Connectivity Power Headroom Report |
| 0 | 11001 | Extended Power Headroom Report |
| 0 | 11010 | Power Headroom Report |
| 0 | 11011 | C-RNTI |
| 0 | 11100 | Truncated BSR |
| 0 | 11101 | Short BSR |
| 0 | 11110 | Long BSR |
| 0 | 11111 | Padding |

TABLE 5

Values of LCID for UL-SCH when "R" bit in MAC subheader is set to "1"

| "R" bit in MAC subheader | Codepoint/Index | LCID values |
| --- | --- | --- |
| 1 | 00000 | Reserved |
| 1 | 00001 | VarShortResumeMAC-EDT-I |
| 1 | 00010-11111 | Reserved |

In another option, the LCID for the Power Headroom Report (PHIR) MAC control element may be reused for another MAC control element if the "R" field is set to "1". For example, when the "R" field in the MAC subheader is set to "1", the LCID assigned for the Power Headroom Report (PHR) MAC control element may be used for VarShortResumeMAC-EDT-I MAC control element or Msg3 quality report MAC control element. In some embodiments, the "R" field in the Power Headroom Report (PHR) MAC control element may be set to "1" to use the 7 remaining bits for another purpose, for example the VarShortResumeMAC-EDT-I MAC control element or CRC check or Msg3 quality report MAC control element etc.

Verification of Integrity Protection in the Network

Case 1: Using a Separate ShortResumeMAC-EDT-I

Figure 9:
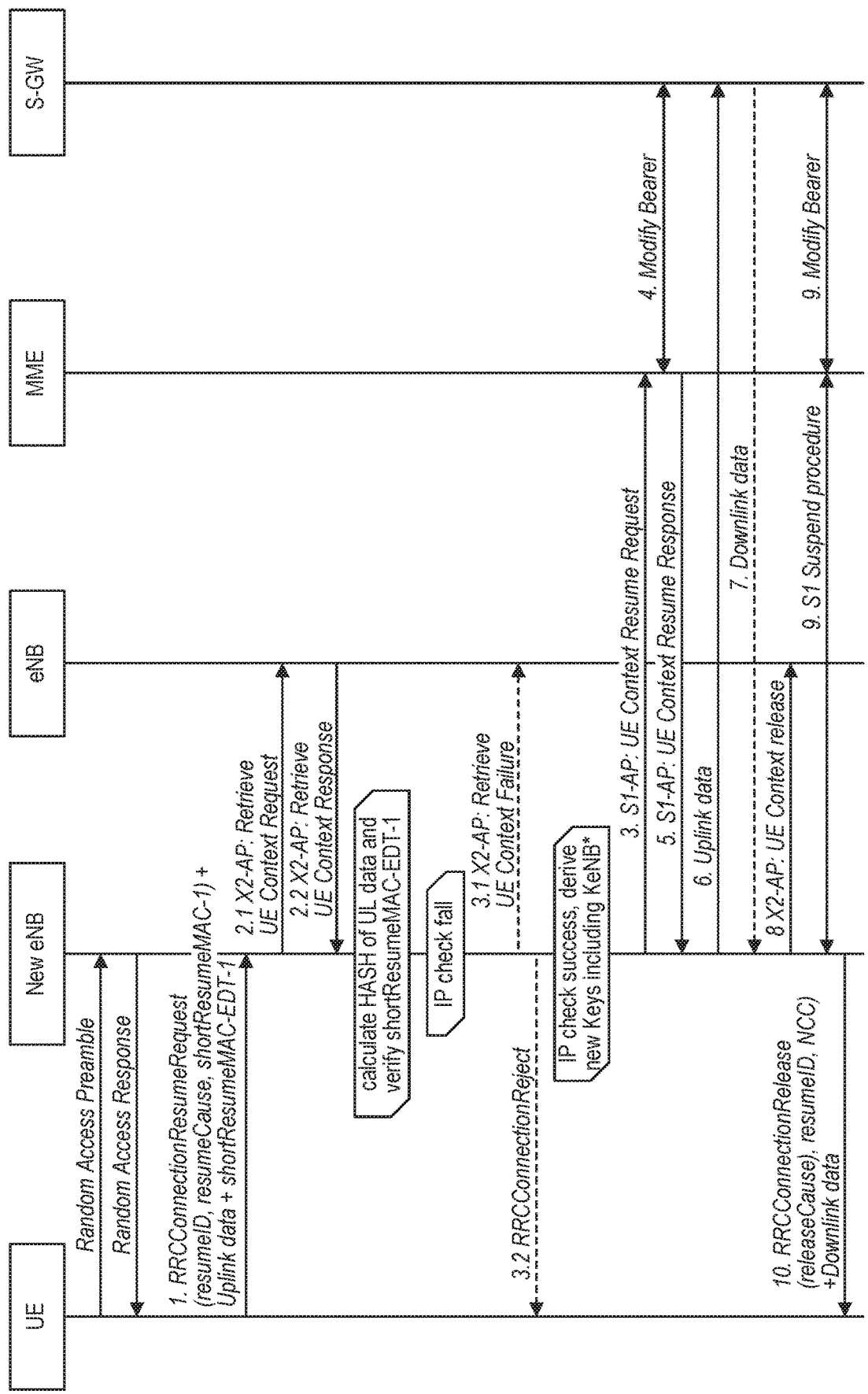
FIG. 9 illustrates an EDT procedure in accordance with some embodiments.

FIG. 9 illustrates an EDT procedure in accordance with some embodiments. As shown in FIG. 9, a separate ShortResumeMAC-EDT-I may be sent to the target eNB. In particular, in EDT, the key (KeNB*) is derived at the target eNB after the source eNB verifies the legacy shortResumeMAC-I and provides UE context together with security context to the target eNB as in the legacy procedure. In this case, the source eNB additionally provides the original KeNB/NH to the target eNB for the derivation of KeNB*.

In some embodiments, as in non-EDT case, the source eNB may always derive the KeNB* after the source eNB verifies the legacy shortResumeMAC-I and provides the KeNB* to the target eNB.

However, after key derivation, the target eNB may first calculate the HASH code of the UL EDT data and check the shortResumeMAC-EDT-I MAC. In some embodiments, the UE may signal UE capability as to whether the UE supports IP of UL data. If the target eNB knows from the retrieved UE context that the UE supports IP of UL data, the target eNB may calculate the HASH code of the UL EDT data to verify the new MAC-I. Alternatively, the first X bit after/before the MAC subheader for the CCCH SDU or CCCH SDU element or the first X bit after/before the MAC subheader for the DTCH SDU or DTCH SDU element may be used for the new MAC-I, if the UE reports the capability to support IP of UL data.

In some embodiments, KRRCint may not be used in the calculation of new MAC-I (shortResumeMAC-EDT-I). In some embodiments, if the old KRRCint is used, then the source eNB may check the shortResumeMAC-EDT-I in which case the legacy shortResumeMAC-I may be ignored by the target eNB. The target eNB may send the shortResumeMAC-EDT-I together with the EDT UL data in the Retrieve UE context request message.

In some embodiments, the newly derived KRRCint may be used in the calculation of new MAC-I (shortResume-MAC-EDT-I). In this case, the target eNB may receive the UE context from the source eNB as the legacy procedure, derive the new keys and HASH code of UL data and verify the new MAC-I (shortResumeMAC-EDT-I). If the check of VarShortResumeMAC-EDT-I MAC is successful, the target eNB may perform the legacy procedure (i.e., derive KeNB*, derive new AS keys using NCC provided by source eNB, if not derived yet, decipher the UL EDT data and forward it to the S-GW). If the check of shortResumeMAC-EDT-I MAC fails, the target eNB can indicate to the source eNB that the context retrieval process failed, send the RRCConnection-Reject message to the UE and discard all UE context, security context (newly derived keys), UL data, shortResumeMAC-EDT-I. The target eNB may also send the RRC-ConnectionSetup message in this case.

Case 2: Provided by SA3

Figure 10:
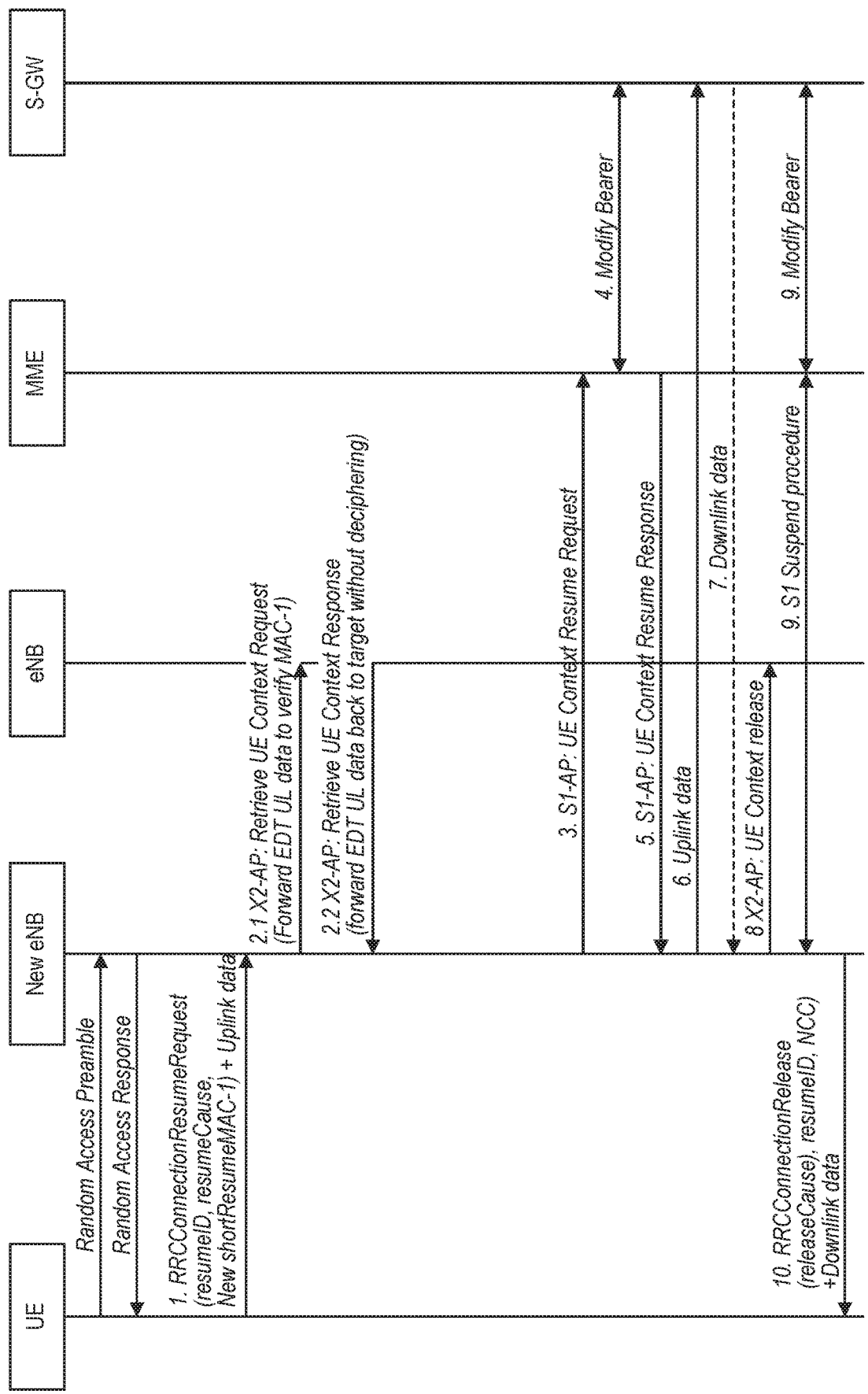
FIG. 10 illustrates another EDT procedure in accordance with some embodiments.

FIG. 10 illustrates another EDT procedure in accordance with some embodiments. FIG. 10 illustrates a case in which the target eNB cannot calculate the HASH code of the UL data without UE context. For this reason, the target eNB may also forward the EDT UL data to the source eNB together with the Retrieve UE Context Request. The source eNB may calculate the HASH code and verify the MAC-I. If the check of the MAC-I is successful, the source eNB may send the Retrieve UE Context Response together with the UL EDT data back to the target eNB. The target eNB may then follow the legacy procedure.

Case 3: Context Relocation not Performed

Figure 11:
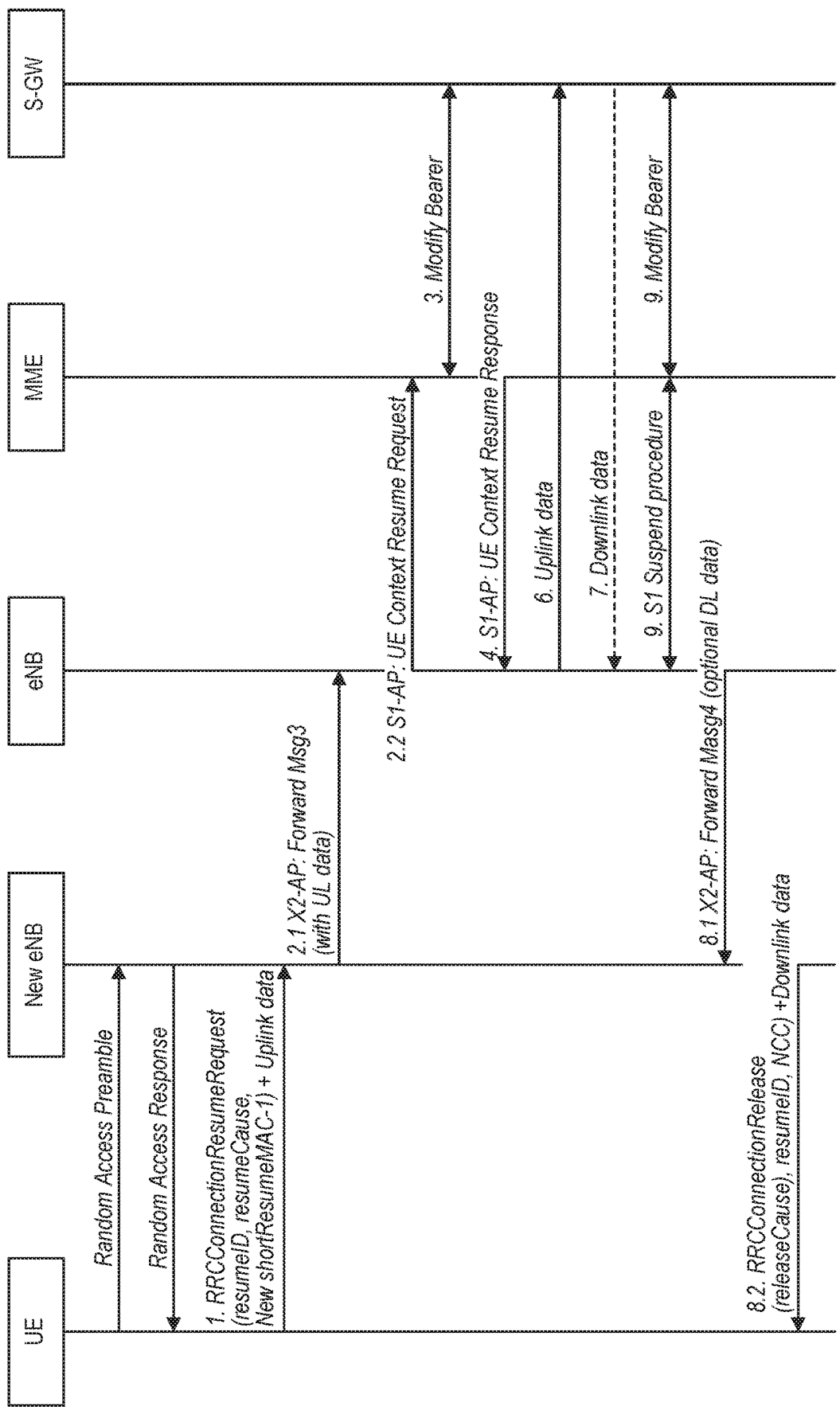
FIG. 11 illustrates another EDT procedure in accordance with some embodiments.

FIG. 11 illustrates another EDT procedure in accordance with some embodiments. In FIG. 11, context relocation may not be performed. The target eNB may instead merely forward the Msg3 content for EDT to the source eNB. Similarly, the source eNB may forward the Msg4 context to the target eNB to deliver to the UE.

In some embodiments, the X2AP signaling details of the method shown in FIG. 10 are provided below. In particular, during the "Verification of integrity protection in the network" section of FIG. 10, step 2.1 and step 2.2 may be realized by a new dedicated class-1 X2AP procedure or by the existing X2AP RETRIEVE UE CONTEXT REQUEST and RESPONSE messages with enhancements, for which one example implementation of the latter is shown as follows:

Retrieve UE Context Request

The RETRIEVE UE CONTEXT REQUEST message may be sent by the new eNB to request the old eNB to transfer the UE Context to the new eNB.

| IE/Group Name | Presence | Range | IE type and reference | Semantics description | Criticality | Assigned Criticality |
|---|---|---|---|---|---|---|
| Message Type | M | | 9.2.13 | | YES | ignore |
| New eNB UE X2AP ID | M | | eNB UE X2AP ID 9.2.24 | Allocated at the new eNB | YES | reject |
| New eNB UE X2AP ID Extension | O | | Extended eNB UE X2AP ID 9.2.86 | Allocated at the new eNB | YES | reject |
| Resume ID | M | | 9.2.91 | | YES | reject |
| ShortMAC-I | M | | BIT STRING (SIZE (16)) | RRC Resume: Corresponds to the ShortResumeMAC-I in the RRCConnectionResumeRequest message as defined in TS 36.331 [9] RRC Reestablishment: Corresponds to the ShortMAC-I in the RRCConnectionReestablishmentRequest message as defined in TS 36.331 [9]. | YES | reject |
| New E-UTRAN Cell Identifier | M | | BIT STRING (SIZE (28)) | RRC Resume: Corresponds to the cellIdentity within the VarShortResumeMAC-Input as specified in TS 36.331 [9]. RRC Reestablishment: Corresponds to the cellIdentity within the VarShortMAC-Input as specified in TS 36.331 [9]. | YES | reject |
| C-RNTI | O | | BIT STRING (SIZE (16)) | C-RNTI contained in the RRC Re-establishment Request message (TS 36.331 [9]). If this IE is present, the Resume ID IE is ignored | YES | reject |
| Failure cell PCI | O | | INTEGER (0..503, ...) | Physical Cell Identifier | YES | reject |
| UL UP-EDT data | O | | OCTET STRING | Uplink UP-EDT data on DTCH multiplexed with the RRCConnectionResumeRequest message on CCCH, for verification of ShortResumeMAC-I as specified in TS 33.401 [18] | YES | ignore |

Retrieve UE Context Request

Retrieve UE Context Response
The RETRIEVE UE CONTEXT RESPONSE message may be sent by the old eNB to transfer the UE context to the new eNB.

| IE/Group Name | Presence | Range | IE type and reference | Semantics description | Criticality | Assigned Criticality |
|---|---|---|---|---|---|---|
| Message Type | M | | 9.2.13 | | YES | Ignore |
| New eNB UE X2AP ID | M | | eNB UE X2AP ID 9.2.24 | Allocated at the new eNB | YES | Ignore |
| New eNB UE X2AP ID Extension | O | | Extended eNB UE X2AP ID 9.2.86 | Allocated at the new eNB | YES | Ignore |
| Old eNB UE X2AP ID | M | | eNB UE X2AP ID 9.2.24 | Allocated at the old eNB | YES | Ignore |
| Old eNB UE X2AP ID Extension | O | | Extended eNB UE X2AP ID 9.2.86 | Allocated at the old eNB | YES | Ignore |
| GUMMEI | M | | 9.2.16 | | YES | Reject |
| UE Context Information | | 1 | | | YES | Reject |
| >MME UE S1AP ID | M | | INTEGER (0..$2^{32}$-1) | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 . . . <maxno of Bearers> | | | EACH | Ignore |
| >>>E-RAB ID | M | | 9.2.23 | | — | — |
| >>>E-RAB Level QoS Parameters | M | | 9.2.9 | Includes necessary QoS parameters | — | — |
| >>>Bearer Type | O | | 9.2.92 | | — | — |
| >>>UL GTP Tunnel Endpoint | M | | GTP Tunnel Endpoint 9.2.1 | SGW endpoint of the S1 transport bearer. For delivery of UL PDUs. | YES | Reject |
| >>>DL Forwarding | O | | 9.2.5 | | YES | Ignore |
| >RRC Context | M | | OCTET STRING | Includes either the RRC Handover Preparation Information message as defined in subclause 10.2.2 of TS 36.331 [9], or the HandoverPreparationInformation-NB message as defined in subclause 10.6.2 of TS 36.331 [9]. | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | — | — |
| >Management Based MDT PLMN List | O | | MDT PLMN List 9.2.64 | | — | — |
| >UE Sidelink Aggregate Maximum Bit Rate | O | | 9.2.97 | This IE applies only if the UE is authorized for V2X services. | YES | ignore |
| Trace Activation | O | | 9.2.2 | | YES | ignore |

-continued

| IE/Group Name | Presence | Range | IE type and reference | Semantics description | Criticality | Assigned Criticality |
|---|---|---|---|---|---|---|
| SRVCC Operation Possible | O | | 9.2.33 | | YES | ignore |
| Masked IMEISV | O | | 9.2.69 | | YES | ignore |
| Expected UE Behaviour | O | | 9.2.70 | | YES | ignore |
| ProSe Authorized | O | | 9.2.78 | | YES | ignore |
| Criticality Diagnostics | O | | 9.2.7 | | YES | ignore |
| V2X Services Authorized | O | | 9.2.93 | | YES | ignore |
| Aerial UE subscription information | O | | 9.2.129 | | YES | ignore |
| Subscription Based UE Differentiation Information | O | | 9.2.136 | | YES | ignore |
| UL UP-EDT data | O | | OCTET STRING | Uplink UP-EDT data forwarded from the old eNB in the RETRIEVE UE CONTEXT REQUEST message | YES | ignore |

Retrieve UE Context Response

| Range bound | Explanation |
|---|---|
| maxnoofBearers | Maximum no. of E-RABs. Value is 256 |

For Case 3 above in the "Verification of integrity protection in the network" section, step 2.1 and step 8.1 may be realized by the new dedicated class-1 X2AP procedure or by the existing X2AP RETRIEVE UE CONTEXT REQUEST and FAILURE messages with enhancements, for which one example implementation of the latter for the RETRIEVE UE CONTEXT FAILURE message is shown as follows: Also for case 1 above in "Verification of integrity protection in the network" section, the RETRIEVE UE CONTEXT FAILURE message can be reused from the new eNB to the old eNB to indicate that integrity protection of the UL EDT data has failed and the old eNB should keep the UE context as it is.

Retrieve UE Context Failure

The RETRIEVE UE CONTEXT FAILURE message may be sent by the old eNB to inform the new eNB that the Retrieve UE Context procedure has failed.

| IE/Group Name | Presence | Range | IE type and reference | Semantics description | Criticality | Assigned Criticality |
|---|---|---|---|---|---|---|
| Message Type | M | | 9.2.13 | | YES | reject |
| New eNB UE X2AP ID | M | | eNB UE X2AP ID 9.2.24 | Allocated at the new eNB | YES | ignore |
| New eNB UE X2AP ID Extension | O | | Extended eNB UE X2AP ID 9.2.86 | Allocated at the new eNB | YES | ignore |
| Cause | M | | 9.2.6 | | YES | ignore |
| Criticality Diagnostics | O | | 9.2.7 | | YES | ignore |
| Old eNB To New eNB Release Container | O | | OCTET STRING | Includes the RRCConnectionRelease message as defined in TS 36.331 [9], encapsulated in a PDCP-C PDU. | YES | ignore |
| Old eNB To New eNB Release with DL Data Container | O | | OCTET STRING | Includes the MAC PDU containing DTCH multiplexed with the RRCConnectionRelease message on DCCH, as defined in TS 36.331 [9], | YES | ignore |

Retrieve UE Context Failure

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
    at least one hardware processor configured to cause a user equipment (UE) to:
        concatenate data of a group of Packet Data Convergence Protocol (PDCP) packets with a security key and a sequence number of one of the PDCP packets to form concatenated data;
        use a hash function to hash the concatenated data to calculate a hash mark;
        separate the hash mark into hash mark portions;
        encode the PDCP packets for transmission to a base station;
        embed the hash mark portions, for transmission to the base station, in respective ones of the PDCP packets; and
        decode a PDCP-Config information element (IE) from the base station, the PDCP-Config IE having:
            an IP-Required-DRB field that indicates whether to send an integrity protection control packet data unit (PDU) for PDCP PDUs in a data radio bearer (DRB) between the UE and the base station, and
            an IP-Groupsize field that indicates PDCP service data units (SDUs) for which the integrity protection is to be checked.

2. The apparatus of claim 1, wherein the sequence number of one of the PDCP packets comprises the sequence number of a last of the PDCP packets.

3. The apparatus of claim 1, wherein the at least one hardware processor is further configured to:
    group the PDCP packets to form the group of PDCP packets based on at least one criterion; and
    encode the PDCP packets for individual transmission to the base station.

4. The apparatus of claim 3, wherein the at least one criterion comprises a traffic pattern of a network of the base station or quality of service (QoS) associated with the PDCP packets.

5. The apparatus of claim 1, wherein the at least one hardware processor is further configured to:
    embed the hash mark for transmission to the base station in an earlier group of PDCP packets to be transmitted to the base station before the PDCP packets.

6. The apparatus of claim 1, wherein the at least one hardware processor is further configured to:
    embed the hash mark for transmission to the base station in a least significant bit of the group of PDCP packets.

7. The apparatus of claim 1, wherein the at least one hardware processor is further configured to:
    separate the group of PDCP packets into sets of PDCP packets, wherein a number of hash mark portions is equal to a number of the sets of the PDCP packets;
    wherein embedding the respective hash mark portions includes embedding a different hash mark portion in only a last PDCP packet of each set of PDCP packets.

8. The apparatus of claim 1, wherein each PDCP packet comprises a PDCP header having a reserved bit that indicates if the hash mark portion is present in the PDCP packet.

9. The apparatus of claim 1, wherein each PDCP packet comprises a PDCP header having a reserved bit that indicates if the PDCP packet is used to determine the hash mark.

10. The apparatus of claim 1, wherein:
    the at least one hardware processor is further configured to encode, for transmission to the base station, a PDCP control packet data unit (PDU) that comprises:
        a PDU type indicating that the PDCP control PDU is an integrity protection packet for the group of PDCP packets, and
        a first sequence number (FSN) of the group of PDCP packets, and
        a number of PDCP packets in the group of PDCP packets is pre-defined or configured by radio resource control (RRC) signaling.

11. The apparatus of claim 1, wherein:
    the at least one hardware processor is further configured to encode, for transmission to the base station, a control PDCP packet data unit (PDU) that comprises:
        a PDU type that indicates if the group of PDCP packets is used to determine the hash mark,
        a first sequence number (FSN) of the group of PDCP packets, and
        a number of PDCP packets in the group of PDCP packets.

12. The apparatus of claim 1, wherein the at least one hardware processor is further configured to:
    determine that Early Data Transmission (EDT) is to be used to transmit a single packet to the base station;
    multiplex, for transmission to the base station if the single packet is a NB-IOT packet, a PDCP control PDU that is specific to EDT transmissions with a PDCP data PDU to form the single packet, the PDCP control PDU comprising an authentication code for integrity protection of data of the PDCP data PDU; and
    if the single packet is smaller than a predetermined size, encode the single packet for transmission to the base station using an EDT grant.

13. The apparatus of claim 12, wherein the at least one hardware processor is further configured to:
  determine overhead involved in the PDCP control PDU;
  decide, based on the overhead, whether to transmit the single packet using the EDT grant; and
  in response to a determination to not transmit the single packet using the EDT grant, fall back to a legacy transmission and discard the PDCP control PDU prior to transmission of the PDCP data PDU.

14. The apparatus of claim 12, wherein:
  the PDCP control PDU comprises:
    a PDU type that indicates if data of the PDCP data PDU is used to determine the hash mark, and
    a hash of the security key, the data of the PDCP data PDU and a sequence number of the PDCP data PDU.

15. An apparatus comprising:
  at least one hardware processor configured to cause a base station (BS) to:
    concatenate data of a group of Packet Data Convergence Protocol (PDCP) packets with a security key and a sequence number of a last of the PDCP packets to form concatenated data;
    use a hash function to hash the concatenated data to calculate a hash mark;
    if the sequence number has a 12 or 18 bit length, generating each PDCP packet to contain data of the PDCP packet, the hash mark, and a PDCP header having: a first reserved bit that indicates if the hash mark is present in the PDCP packet, and a second reserved bit that indicates if the PDCP packet is used to determine the hash mark;
    if the sequence number has a 7 or 15 bit length, encode, for transmission to a user equipment (UE), a PDCP control packet data unit (PDU) comprising: the hash mark, a first sequence number (FSN) of the group of PDCP packets, and a PDU type indicating that the PDCP control PDU is an integrity protection packet for the group of PDCP packets; and
    encode the PDCP packets for transmission to the UE.

16. The apparatus of claim 15, wherein the at least one hardware processor is further configured to:
  separate the hash mark into hash mark portions and one of:
    embed a different hash mark portion in each PDCP packet, or
    separate the group of PDCP packets into sets of PDCP packets, a number of hash mark portions equal to a number of the sets of the PDCP packets, and embed a different hash mark portion in only the last PDCP packet of each set of PDCP packets.

17. A non-transitory computer-readable storage medium storing program instructions that, when executed by one or more processors of a user equipment (UE), cause the UE to:
  concatenate data of a group of Packet Data Convergence Protocol (PDCP) packets with a security key and a sequence number of a last of the PDCP packets to form concatenated data;
  use a hash function to hash the concatenated data to calculate a hash mark;
  if each PDCP packet has reserved bits, transmit the PDCP packets to a base station, the PDCP packet comprising data of the PDCP packet, the hash mark, and a PDCP header having: a first reserved bit that indicates if the hash mark is present in the PDCP packet, and a second reserved bit that indicates if the PDCP packet is used to determine the hash mark;
  if each PDCP packet does not have reserved bits, transmit to the base station:
    a PDCP control packet data unit (PDU) comprising: the hash mark, a first sequence number (FSN) of the group of PDCP packets, and a PDU type indicating that the PDCP control PDU is an integrity protection packet for the group of PDCP packets, and the PDCP packets.

18. The non-transitory computer-readable storage medium of claim 17, wherein the program instructions are further executable to cause the UE to:
  separate the hash mark into hash mark portions and one of:
    embed a different hash mark portion in each PDCP packet, or
    separate the group of PDCP packets into sets of PDCP packets, a number of hash mark portions equal to a number of the sets of the PDCP packets, and embed a different hash mark portion in only the last PDCP packet of each set of PDCP packets.

19. The non-transitory computer-readable storage medium of claim 17, wherein the program instructions are further executable to cause the UE to:
  decode a PDCP-Config information element (IE) from the base station, the PDCP-Config IE having:
    an IP-Required-DRB field that indicates whether to send an integrity protection control packet data unit (PDU) for PDCP PDUs in a data radio bearer (DRB) between the UE and the base station, and
    an IP-Groupsize field that indicates PDCP service data units (SDUs) for which the integrity protection is to be checked.

* * * * *